Patented Apr. 28, 1936

2,039,238

UNITED STATES PATENT OFFICE 2,039,238

CONDENSATION DERIVATIVES OF RUBBER

Herman R. Thies, Akron, Ohio, assignor to Wingfoot Corporation, Wilmington, Del., a corporation of Delaware No Drawing. Application January 19, 1934, Serial No. 707,415

1 Claim. (Cl. 106—23)

This invention relates to the treatment of condensation of derivatives of rubber. It includes the method of treating the rubber derivatives and the treated product.

By treating rubber in various ways a moldable product may be formed which has a $(C_5H_8)_x$ nucleus in which more carbon atoms are directly connected than in rubber. These molding materials oxidize on exposure to air and material which has been stored in contact with the air sticks to the mold when molded. According to this invention the molding material is protected from oxidation by coating it with a film which protects it from the air. For this film soap or other mold lubricant is preferred altho other materials which form an oxygen-excluding coating may be employed.

The molding material may be formed by treating a boiled solution of rubber with the halide of an amphoteric metal such as tin tetra chloride, ferric chloride, aluminum chloride, or chromic chloride, etc. By such treatment a product is formed which in purified form has the empirical formula $(C_5H_8)_x$ and in which more carbon atoms are directly connected than in rubber. By using chlorostannic acid or hydrochloric acid and the halide of an amphoteric metal, such as stannic chloride or ferric chloride, etc., a chlorine-containing derivative is produced which has a $(C_5H_8)_x$ nucleus and in which more carbon atoms are directly connected than in rubber. Other moldable products having the same nucleus may be prepared. They are all referred to herein as condensation derivatives of rubber.

A moldable product may, for example, be prepared by plasticizing pale crepe rubber to a plasticity of 300 as measured by a Williams plastometer. This is dissolved in sufficient benzene to form a 10% solution. 350 pounds of the cement are treated with 10% of crystalline chlorostannic acid ($H_2SnCl_6.6H_2O$), based on the weight of the rubber, by heating at the boiling point for several hours. It appears that by this treatment a tin addition compound of rubber is produced. The molding material is formed by decomposing this tin addition compound. The softening point of the molding material produced depends upon the extent to which the chlorostannic acid is allowed to react with the rubber. A product of low softening point is first produced and the softening point gradually increases as the reaction is continued. A product which molds at about 260–300° F. is generally preferred although a rubber derivative which can be molded at a higher or lower temperature may be produced by properly controlling the chlorostannic acid reaction. When the reaction has proceeded to the desired point it is terminated preferably by the addition of ½ pound of water for each pound of chlorostannic acid used. The reaction mixture is then cooled and filtered and poured with stirring in a large volume of water, for example 2½ gallons for each gallon of the reacted cement. A small amount of sodium sulfite is advantageously added to the water to prevent oxidation. The emulsion obtained is steam distilled with agitation to remove the solvent and the molding material precipitates as a fine, sand-like powder.

The powder may be coated with a film of material which prevents oxidation although ordinarily it will be preferred to agglomerate the powder to some extent to produce a mass with a smaller surface before coating it. Such agglomeration may advantageously be effected by milling the product on a heated rubber mill or by extruding through a die. The milled or extruded product may then be formed into blanks of a standard size or blanks may be formed by heating and pressing. The material may be milled and ground and if desired the ground material may be sieved to obtain a molding powder of uniform size. Any of these products may be coated according to the process of this invention.

The molding material may be colored or otherwise treated before coating if desired. It may be colored by milling with soluble dyestuffs or pigments or fillers such as asbestos and plasticizers such as oils and waxes, etc. may be incorporated on a rubber mill.

To coat the molding material a water solution of soap or other oxygen-excluding material may be used, or solutions of waxes, etc. in organic solvents may be employed. Where a solvent for the molding material is employed care should be taken not to cause agglomeration of the particles or blanks of the molding material. If the molding material is colored with a soluble dyestuff, solvents for the dyestuff should be avoided in the coating process.

The particular coating to be used may be selected with respect to the effect it may have upon the molding properties and upon the molded product. Any large amount of lubricant may weaken the molded product. The minimum amount of the coating material which will give an air-excluding film will therefore generally give the most satisfactory results, especially where the molding material is in finely divided form. Some lubricants tend to stain the surface of the molded product unless evenly dispersed in the material, and where such staining would be objectionable the coating material should be selected with care, particularly where the molding material to be coated is in the form of relatively large blanks and also where the molding material is agglomerated into a large bulk of material and coated for storage and then ground or otherwise subdivided before use.

For coating ground material comprising pieces about ¼ to ⅛ inch through, a solution of castile soap in water is satisfactory up to 1% in strength, but a ¼% solution is preferred where the strength of the molded product is important. Other soaps, such as Ivory soap may be used in dilute solution to prevent oxidation. A 0.10% solution of saponin prevented sticking when the mold was washed with benzene-saturated waste between each run. A solution containing less than 0.10% of the sodium salts of sulfonic acids of the higher alcohols may be used. Acetone saturated with beeswax or beeswax and paraffin is satisfactory. A small amount of oleic acid, e. g. one part in fifty or seventy-five parts of acetone may be used satisfactorily. Acetone saturated with cocoanut oil may be used where staining of the molded product is not of importance.

The coating material may be applied by tumbling the molding material in an atmosphere containing a finely atomized solution of the coating material or the molding material may be dipped in a bath of the coating material or the coating may be applied in any other suitable way. If the molding material is in the form of a sheet it may be brushed with a solution of the coating material. The coated product is then dried. If a lubricating material is employed for coating, the coated molded product may be introduced directly into the mold and the lubricant will aid in the molding operation.

What I claim is:

A mass of moldable material composed essentially of a thermoplastic condensation derivative of rubber prepared by the treatment of rubber with the halide of an amphoteric metal or chlorostannic acid, which material is protected from oxidation by an oxygen-excluding film of a mold lubricant.

HERMAN R. THIES.